United States Patent
Bischof

(10) Patent No.: US 7,683,138 B1
(45) Date of Patent: Mar. 23, 2010

(54) MOLDING COMPOSITIONS

(75) Inventor: Charles S. Bischof, Allegany, NY (US)

(73) Assignee: Henkel Corporation, Rocky Hill, CT (US)

( * ) Notice: Subject to any disclaimer, the term of this patent is extended or adjusted under 35 U.S.C. 154(b) by 285 days.

(21) Appl. No.: 11/129,348

(22) Filed: May 16, 2005

(51) Int. Cl.
*C08L 63/00* (2006.01)

(52) U.S. Cl. .................................... 525/396

(58) Field of Classification Search ............. 525/396
See application file for complete search history.

(56) References Cited

U.S. PATENT DOCUMENTS

| | | | | | |
|---|---|---|---|---|---|
| 3,475,513 | A | * | 10/1969 | Benson | 525/396 |
| 5,037,897 | A | * | 8/1991 | Glans et al. | 525/397 |
| 5,081,185 | A | * | 1/1992 | Haaf et al. | 525/68 |
| 5,204,418 | A | * | 4/1993 | Yasue et al. | 525/445 |
| 6,576,718 | B1 | * | 6/2003 | Yeager et al. | 525/523 |
| 2003/0194560 | A1 | * | 10/2003 | Spera et al. | 428/411.1 |
| 2004/0084769 | A1 | * | 5/2004 | Sugaya et al. | 257/734 |

FOREIGN PATENT DOCUMENTS

WO      WO01/79351      * 10/2001

* cited by examiner

*Primary Examiner*—Mark Eashoo
*Assistant Examiner*—Megan McCulley
(74) *Attorney, Agent, or Firm*—Steven C. Bauman

(57) ABSTRACT

A curable composition exhibiting excellent moldability without mold staining or delamination is provided, including an epoxy resin, a curing agent for the epoxy resin, and a polyphenylene oxide compound having a glass transition temperature between about 165° C. and about 190° C. The polyphenylene oxide compound may be provided as a melt blended mixture of two polyphenylene oxide compounds having distinct glass transition temperatures. The curable compositions may further include a bulk filler, and are therefore particularly useful as molding compounds encapsulation of electrical and/or electronic parts in transfer molding operations.

20 Claims, No Drawings

MOLDING COMPOSITIONS

BACKGROUND OF THE INVENTION

1. Field of the Invention

The present invention relates to curable compositions having long term moldability, particularly epoxy-based molding compounds exhibiting moisture resistance and long term moldability without staining the mold surface.

2. Brief Description of Related Technology

Epoxy resins are widely used in molding compounds for coating electrical and electronic devices. Such epoxy molding compounds used for encapsulation are generally prepared from a blend of an epoxy resin and phenol hardener, along with other ingredients including fillers, catalysts, flame-retardant materials, processing aids, and colorants. Epoxy resins in such molding compounds are traditionally diepoxides which include two epoxy groups per molecule, which are reacted with a co-reactant (cross-linking agent or hardener), such as an acid dianhydride, diamine, or diphenol oligomers. Diphenol oligomers, such as those derived from novolac phenols, cresol phenols and bisphenol A, are particularly preferred in the art as hardeners due to their high reliability.

An important feature of such epoxy molding compositions is their ability to mold within standard industry molding operations to provide an encapsulated electrical or electronic device which does not include any defects, whether functionally or cosmetically. For example, during the molding operation, the molding composition is subjected to increased temperatures to cause curing of the composition and encapsulate the electronic device. The composition should exhibit appropriate adherence to the surfaces of the electronic device to prevent delamination, should not include any voids, blisters, knitlines, etc., and should properly release from the mold equipment without causing any staining, flow marks, or the like.

The Joint Electron Devices Engineering Counsel (JEDEC) has set forth a series of test parameters for proper moldability for such molding compositions. JEDEC Level 1 testing requires molding materials to be exposed to 85° C. and 85% relative humidity for a period of 168 hours, after which time the molding materials are heated to a temperature of 260° C. The molding material is then analyzed for any voids or defects and for delamination.

It is recognized in the industry that stress reliever compounds such as polyphenylene oxide can be incorporated into such molding compositions to reduce package stress and improve interface adherence properties required for achieving the JEDEC Level 1 testing procedures. However, such polyphenylene oxide compounds may cause the molding equipment to develop mold stains, or may cause defects in the aesthetics of the molded article such as flow marks on the article, during prolonged use. For example, typical transfer molding operations may involve a single piece of molding equipment which is continuously charged with a molding composition in the form of a pellet. The pellet is heated and flowed or forced into a molding cavity to envelop an electronic substrate contained in the mold cavity and to cure, thereby encapsulating the substrate in a desired shape according to the shape of the mold. During prolonged use, the molding equipment is continuously charged with a substantial number of pellets, commonly referred to as "shots". After prolonged use, mold stains may develop in the molding cavity and/or flow marks may appear on the molded articles, believed to be due to one or more compositions within the molding compound forming a streaking effect.

Accordingly, it would be desirable to provide molding compositions that exhibit long term moldability including interface adherence properties capable of meeting industry standards without adverse affects such as mold staining or flow marks.

SUMMARY OF THE INVENTION

The present invention provides a curable composition including an epoxy resin, a curing agent for promoting curing of the epoxy resin, and a polyphenylene oxide compound having a glass transition temperature (Tg) between about 165° C. and about 190° C. Desirably, the polyphenylene oxide compound is prepared as a melt blended mixture of at least two polyphenylene oxide compounds having distinct Tg's. For example, a first polyphenylene oxide compound having a Tg below about 200° C. may desirably be melt blended with a second polyphenylene oxide compound having a Tg above about 220° C.

In a further embodiment, the present invention is directed to a curable composition including an epoxy resin, a curing agent for promoting curing of the epoxy resin, and a melt blended mixture of at least two polyphenylene oxide compounds, each having a distinct Tg. Desirably, the composition includes two polyphenylene oxide compounds, with the Tg of the first polyphenylene oxide compound differing from the Tg of the second polyphenylene oxide compound by a range greater than about 20° C.

Desirably, the curable composition is prepared as a molding composition. Accordingly, a further embodiment of the present invention involves a molding composition including an epoxy resin, a curing agent for promoting curing of the epoxy resin, a polyphenylene oxide compound having a Tg between about 165° C. and about 190° C., and an inorganic filler material. The molding composition may further include additional components, such as coupling agents, adhesion modifiers, mold release agents, colorants, rheology modifiers, catalysts, antioxidants, ion scavengers, flame retardants, and combinations thereof. Such a molding composition is particularly useful as an encapsulant material for an electrical or electronic device, where the molding composition is coated or molded through a molding operation over the device and then cured, with the cured reaction product forming an encapsulant or packaging over the device. The polyphenylene oxide compound may further provide stress relief characteristics to the molding composition.

In yet a further embodiment, the present invention is directed to a method of improving moldability such as by reducing staining of mold surfaces and/or reducing flow marks in a molded product during a transfer molding operation. The method involves providing an epoxy-based molding composition with a polyphenylene oxide compound having a Tg between about 165° C. and about 190° C. The polyphenylene oxide compound may be a melt blended mixture of at least two polyphenylene oxide compounds having different Tg's, such as a first polyphenylene oxide compound having a Tg below about 200° C., and a second polyphenylene oxide compound having a Tg above about 220° C. The polyphenylene oxide compound is desirably provided in an amount up to about 10 percent by weight of the total molding composition.

Further, the present invention involves a method of coating an electrical or electronic device by heating a molding composition to a temperature sufficient to cure the molding composition and to form a polymer on the surface of the device, wherein the molding composition includes an epoxy resin, a curing agent for promoting curing of the epoxy resin, and a polyphenylene oxide compound having a Tg between about 165° C. and about 190° C.

Other features and advantages of the invention will be apparent from the description of the preferred embodiments thereof and from the claims.

DETAILED DESCRIPTION OF THE INVENTION

Other than in the operating examples, or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein, the term "substantially free" is meant to indicate that a material is present as an incidental impurity. In other words, the material is not intentionally added to an indicated composition, but may be present at minor or inconsequential levels because it was carried over as an impurity as part of an intended composition component.

As used herein the term "cured" is meant to indicate a three-dimensional crosslink network formed by covalent bond formation, e.g., between the functional groups of the hardener and the epoxy groups of the resin. The temperature at which the composition of the present invention cures is variable, and depends in part on the conditions and the type and amount of catalyst, if any is used.

The present invention is directed to a curable composition that exhibits long term moldability properties, such as proper flow and wetting out of the composition without the composition sticking to the mold or staining the mold during use in molding procedures. In view of such properties, the curable composition is well suited as a molding composition, particularly for use in encapsulation and packaging of electrical or electronic devices such as through transfer molding procedures. While the invention is discussed herein in terms of use as a molding composition, it is noted that the curable composition is not necessarily limited as such, and may therefore encompass other curable compositions, for example, electronic underfill compositions.

The inventive composition is an epoxy-based curable composition, including an epoxy resin and a curing agent for promoting curing or hardening of the epoxy resin. There is no restriction on the type of epoxy resin that can be used in the molding compositions. Desirably, the epoxy resin contains two or more reactive oxirane groups. For example, the epoxy resin may be selected from, but not limited to, bisphenol A type epoxy resins; novolac type epoxy resins, such as epoxy cresol novolac resin and phenolic novolac epoxy resin; alicyclic epoxy resins; glycidyl type epoxy resins; biphenyl epoxy resins; naphthalene ring-containing epoxy resins; cyclopentadiene-containing epoxy resins; polyfunctional epoxy resins; hydroquinone epoxy resins; and stilbene epoxy resins. The molding compositions can include more than one epoxy resin; for example, a combination of epoxy cresol novolac resin and biphenyl epoxy resin.

As noted, bisphenol and biphenyl epoxy resins, which are traditionally referenced as di-epoxies, and epoxy cresol novolac resins, which are traditionally referenced as multifunctional epoxies, are useful in the present invention. Such epoxies have a degree of branching of two, in that two phenolic groups having pendant epoxies are linked through the same carbon atom. For example, diglycidyl ether of bisphenol A is difunctional, including two phenolic groups with pendant epoxies extending from a central carbon atom. It therefore has a degree of branching of two. Epoxy cresol novolac resins are oftentimes referenced as "multifunctional," in that they are polymeric compounds with a plurality of pendant epoxy moieties which may extend from the polymeric chain. For example, epoxy cresol novolac resins include the following structure:

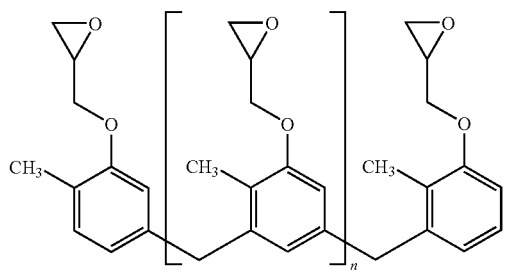

In the instance where n=0, the functionality of this structure would be 2. If n=1, the functionality, is 3; if n=4, the functionality is 6; etc. As such, this compound is traditionally referred to as a multifunctional epoxy resin. However, since only two phenolic groups extend from the same carbon or small cluster of carbons, the degree of branching of this type of resin would be equal to two.

In one embodiment, the epoxy resin may be a multifunctional epoxy resin having a degree of branching within the resin backbone of at least three. Thus, desirable multifunctional epoxy resins are those derived from phenol, and which include at least three phenolic groups branching directly from the same central carbon atom or central cluster of carbons, with a pendant oxirane group linked to each of the at least three phenolic groups.

Non-limiting examples of useful multifunctional epoxy resins having a degree of branching of at least three include:

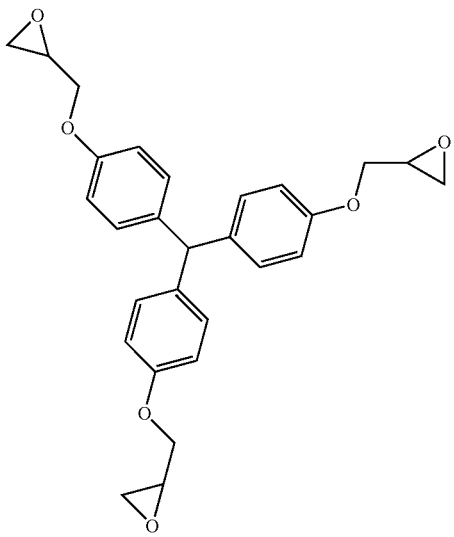

triphenylol methane triglycidyl ether (having a degree of branching of three, represented by three terminal glycidyl ether moieties branching from a central carbon atom); and

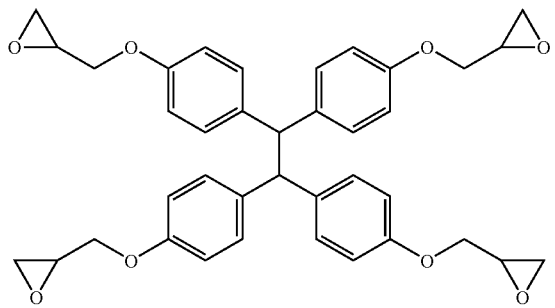

tetra glycidyl ether of tetra phenol ethane (having a degree of branching of four, represented by four terminal glycidyl ether moieties branching from a central two carbon cluster ethyl moiety).

Epoxy resins derived from tris-phenolmethane, such as triphenylol methane triglycidyl ether are also useful. The multifunctional resin having a degree of branching of at least three may be used alone, or in combination with conventional resins such as those described above. The epoxy resin typically has a theoretical epoxy equivalent weight of about 150 to 250.

The present molding composition contains the epoxy resin at a level of at least 1 percent, in some case at least 4 percent, in other cases at least 5 percent, and in some situations at least 5.5 percent by weight of the molding composition. Also, the epoxy resin is present in an amount of up to 12 percent, in some cases up to 11 percent, in other cases up to 9 percent and in some situations up to 8.5 percent by weight of the molding composition. The molding composition may contain the epoxy resin in any range of values inclusive of those stated above.

A curing agent (hardener) may be included in the present molding composition. The curing agent or hardener promotes crosslinking of the molding composition to form a polymer composition upon heating of the composition to a temperature of at least 135° C. Some suitable curing agents that can be included in the molding compositions of the present invention are phenol novolac type hardener, cresol novolac type hardener, dicyclopentadiene phenol type hardener, limonene type hardener, and anhydrides. Flexible hardeners having a hydroxyl equivalent weight greater than about 150 are often desirable, such as xylock novolac type hardener. Non-limiting examples of flexible hardeners include bisphenol M, commercially available from Borden Chemical, and DEH 85, commercially available from Dow Chemical. Similar to the epoxy resin component, more than one type of curing agent can be included in the molding compositions. The hardener typically has an epoxy equivalent weight of about 100 to 150. As with the epoxy resin component, multifunctional hardeners having a degree of branching of at least three are useful in one embodiment of the present invention, such as those derived from tris-phenol and which contain at least three functional groups that are reactive with epoxide groups.

The present molding composition contains the hardener at a level of at least 1 percent, in some case at least 1.5 percent, in other cases at least 2 percent, and in some situations at least 2.5 percent by weight of the molding composition. Also, the hardener is present in an amount of up to 10 percent, in some cases up to 9 percent, in other cases up to 8 percent and in some situations up to 6 percent by weight of the molding composition. The molding composition may contain the hardener in any range of values inclusive of those stated above.

In addition, the composition of the present invention further includes a polyphenylene oxide (PPO) compound having a specific glass transition temperature (Tg). PPO compounds are known for use in epoxy molding compositions, particularly as a stress reliever and/or as an adhesion promoter. These known PPO compounds have a Tg less than about 165° C. (as measured at the melt onset temperature through differential scanning calorimetry, DSC), and are referred to herein as low Tg PPO compounds. Epoxy-based molding compounds including such low Tg PPO compounds are capable of meeting certain industry standards, such as passing JEDEC Level 1 performance standards at 260° C., particularly with respect to adhesion and delamination characteristics. However, moldability standards and packaging cosmetics may be compromised in such molding compositions incorporating low Tg PPO compounds therein, particularly with increasing amounts of low Tg PPO compounds included in the composition. In particular, repeated use of such molding compositions in conventional transfer molding operations may result in mold staining of the transfer molding equipment, and/or may result in defects in the molded articles, such as flow marks, knitlines, voids, blisters, and the like, all of which are unacceptable in the industry for transfer molding operations.

Providing the molding composition with a PPO compound having a high Tg does not provide for acceptable performance standards. High Tg PPO compounds, such as those having a Tg of greater than about 220° C. (as measured at the melt onset temperature through DSC), and more particularly those greater than about 200° C., greatly improve the moldability of molding compositions with respect to mold staining, flow marks, and the like. However, such high Tg PPO compounds also significantly affect the adhesion properties of the molding compositions, resulting in molded articles which fail to meet industry standards, such as JEDEC Level 1 performance standards at 260° C.

It has been unexpectedly discovered that epoxy compositions including a PPO compound having a higher Tg than traditional lower Tg PPO compounds will improve the moldability standards, so long as the Tg of the PPO compound is controlled within a specific range. In particular, the present invention incorporates PPO compounds having a specific Tg within epoxy-based compositions, and in particular within molding compositions for transfer molding procedures. Such molding compositions are capable of meeting industry standards with respect to JEDEC Level 1 performance standards at 260° C., and also provide improved moldability with respect to mold staining, flow marks, and the like, particularly when compared with molding compositions including traditional low Tg PPO compounds.

The molding compositions of the present invention include a PPO compound having a Tg between about 165° C. and 190° C. (as measured at the melt onset temperature through DSC). It has been unexpectedly discovered through the present invention that PPO compounds having a Tg within this temperature range pass JEDEC Level 1 performance standards at 260° C. as well as provide excellent moldability, without exhibiting mold staining or flow marks on the molded device, thereby providing improved properties when compared with both conventional low Tg PPO compounds and with high Tg PPO compounds.

The amount of the PPO compound having the specific Tg range may be included in the composition at any range useful for imparting stress relief characteristics to the composition. Useful ranges of the PPO compound encompass from about 0.1 percent to about 10 percent by weight, desirably from about 0.5 percent to about 3.0 percent, more desirably from about 0.8 percent to about 2.0 percent by weight, based on the total weight of the composition.

Desirably, the PPO compound includes a melt blended mixture of at least two PPO compounds which have distinct Tg's from each other. Such a melt blended mixture may be composed of a two separate PPO compounds, with the Tg of the first PPO compound differing from the Tg of the second PPO compound by a range greater than about 20° C. For example, a first PPO compound having a Tg below about 200° C., more desirably between about 150-180° C., may be melt blended with a second PPO compound having a Tg above about 220° C., more desirably between about 220-250° C.

The melt blended mixture may be prepared by combining and mixing the PPO compounds having distinct Tg's at elevated temperatures, desirably at temperatures above the glass transition temperature of at least one, and desirably all of the distinct compounds. The mixing may involve co-extruding the distinct compounds at a temperature above the Tg of all of the distinct PPO compounds. Desirably, the melt blended mixture is prepared by mixing and co-extruding the distinct PPO compounds through an extruder at a temperature at or above about 230° C. Such a melt mixed or melt blended mixture provides a homogeneous PPO compound having a Tg which is distinct from the Tg of any one of the PPO compounds making up the melt blended mixture. The specific Tg of the homogeneous melt blended mixture is based on the Tg of the individual PPO compounds, as well as the amount of each of the individual PPO compounds included within the mixture.

Desirably, the melt blended mixture includes a first PPO compound having a low Tg (below about 160° C.) in an amount of between 25%-90% based on the blended PPO mixture, and a second PPO compound having a high Tg (above about 220° C.) in an amount of between about 10%-75% based on the blended PPO mixture. For example, the ratio of the first, low Tg PPO compound to the second, high Tg compound is desirably from about 3:1 to about 1:1. Desirably, the melt blended mixture is a homogenous mixture including about 60% of a low Tg PPO compound (below about 160° C.) and about 40% of a high Tg PPO compound (above about 220° C.). Such a melt blended mixture has been shown through the present invention to provide a homogeneous PPO compound having a Tg of about 165°-175° C., and is well suited for the present invention.

As noted, the compositions of the present invention are particularly well suited as molding compositions for use in encapsulating or packaging of electrical or electronic devices, such as through transfer molding operations. Accordingly, such molding compositions may include an inorganic filler material. Non-limiting examples of suitable filler materials include silica, alumina, aluminum oxide, aluminosilicate, silicon nitride, aluminum nitride, silica-coated aluminum nitride, born nitride, clay, talc, mica, kaolin, calcium carbonate, wollastonite, montmorillonite, smectite, rubber particles, nanoparticles, nanoclays, and mixtures and combinations thereof. Such filler materials are commonly present in the composition in amounts of about 20 to 90 percent by weight, desirably from about 50 to 90 percent by weight, and more desirably from about 60 to 90 percent by weight based on the total weight of the composition. In embodiments where the curable composition is in the form of a molding composition, the filler desirably represents the bulk amount of the molding composition.

The compositions of the present invention can include other optional additives known to those of skill in the art known to impart specific properties to the molding composition, depending on the intended application of the product. For example, one or more components selected from catalysts, flame retardants, coupling agents, adhesion promoters, mold release agents, ion scavengers, colorants, rheology modifiers, toughening agents, UV absorbers, antioxidants, and mixtures and combinations of such components may be included in the composition.

For example, any catalysts which are useful for promoting reaction of the epoxy resin and the hardener may be incorporated into the composition of the present invention. Non-limiting examples of optional catalysts which are useful include tertiary amines, substituted phosphines, salts of quaternary organophosphonium compounds, imidazoles, and the like, with compounds such as 1,8-diazabicyclo[5.4.0]undec-7-ene ("DBU"), dicyandiamide ("DICY") and triphenylphosphine ("TPP") being particularly well known for use as catalysts. Additionally, salts of quaternary organophosphonium compounds may be used as a catalyst, including organophosphonium functional acetic acid ester compounds, such as ethyltriphenylphosphonium acid acetate complex ("EtTPPOAc"), commercially available from Rohm and Haas.

Any suitable flame-retardant known in the art may be included in the composition. Non-limiting examples of suitable flame-retardants include bromine-containing flame retardants; phosphorus-containing flame retardants; antimony oxide flame retardants; transition metal oxides such as tungsten trioxide, molybdenum trioxide, zinc molybdate, calcium molybdate and zinc borate; melamine cyanurate; and mixtures and combinations thereof. Desirably, bromine-free flame retardants, commonly referred to as "green compounds", are used. When included, the flame retardant may be provided in any effective amount, such as from about 1 weight percent to about 5 weight percent based on the total weight of the molding composition.

Mold release agents are chemical agents commonly used to assist in the release of the cured epoxy molding compounds from the curing mold. Examples of useful mold release agents include carnauba wax, paraffin wax, polyethylene wax, polytetrafluoroethylene wax, ester waxes (such as EWAX commercially available from Hoechst Chemical), acid waxes (such as SWAX commercially available from Hoechst Chemical), glycerol monostearate, and metallic stearates, and mixtures thereof. The mold release agent may be provided in an amount of from about 0.1 weight percent to about 2 weight percent based on the total weight of the molding composition, when included.

Coupling agents are known to improve the dry electrical properties of compounds. Examples of useful coupling agents include silane-type coupling agents, characterized by the formula $R'Si(OR)_3$, where $R'$ represents an organo-funtional group such as amino, mercapto, vinyl, epoxy or methacryloxy, and OR represents a hydrolyzable alkoxy group attached to the silicon. The coupling agent may be provided in an amount of from about 0.1 weight percent to about 2 weight percent based on the total weight of the molding composition, when included.

Examples of useful colorants include carbon black, pigments, dyes, and the like. When included, the colorant may be provided in an amount of from about 0.1 weight percent to about 2 weight percent based on the total weight of the molding composition.

Ion scavengers, such as magnesium aluminum carbonate hydrate, which can be obtained commercially from Kyowa Chemical Industry Co. under the trade name "DHT-4A," are suitable for use in the composition of the present invention and may be present in amounts of from about 0 to about 2 percent by weight, more often from about 0.5 to about 2 percent by weight, when present.

Additional additives may be included in the compositions of the present invention, including metal borate salts such as zinc borate; Group IIB oxides such as zinc oxide; polyhydroxides of Group IIA and Group IIIB elements such as aluminum trihydrate and magnesium hydroxide; and fumed silica. Such additives, when included, may be provided in amounts up to about 3 percent by weight.

The molding compositions can be prepared by any conventional method. For example, as is known in the art, all of the compounds may be combined and finely ground and dry blended, or the components can be mixed in a step-wise fashion to enhance homogeneous mixing. The mixture can then be treated on a hot differential roll mill, such as with a large two-roll mill (one roll heated to about 90° C., and the other cooled with tap water), to produce uniform sheets, which are then ground to a powder after cooling. Alternatively, the mixture can be extruded through a twin screw extruder, as known in the art.

In embodiments where the PPO compound includes a melt blended mixture of two or more PPO compounds having distinct Tg's, the melt blended mixture is prepared, as described above, prior to being combined with the remaining components forming the composition.

The present invention is also directed to a method of coating an electrical or electronic device by heating the above-described molding composition to a temperature sufficient to cure the molding composition and form a polymer on the surface of the device. The molding compositions can be molded into various articles by any conventional method, e.g., by using a molding apparatus, such as a transfer press equipped with a multi-cavity mold for coating electronic devices. Suitable molding conditions include a temperature of about 150° C. to about 200° C., in some cases about 165° C. to about 195° C., and in other cases about 175° C. to about 195° C. and a pressure of about 400 psi to about 1,500 psi.

The preferred molding compositions cure in about 0.5 minute to about 3 minutes, more preferably, about 1 minute to about 2 minutes. To determine the time for curing (i.e., minimum time needed for forming a good cure which is strong and not brittle), the molding composition is placed in the mold press at 190° C. and is inspected after a pre-set period of time (e.g., 3 minutes). If a good cure (i.e., strong and not brittle) is formed, the experiment is repeated with a shorter period of press time until the minimum time period is determined.

As noted above, the compositions of the present invention are particularly useful as molding compounds for electrical or electronic devices. Accordingly, the present invention provides an electrical or electronic device prepared in such a manner. Non-limiting examples of such electrical or electronic devices include semiconductors, transistors, diodes, and integrated circuits.

By incorporating a PPO compound having a specific Tg, molding compositions prepared in accordance with the present invention unexpectedly exhibit performance properties sufficient to meet JEDEC level 1 performance standards, while also exhibiting excellent moldability without mold staining, flow marks or streaking over the molded parts with continuous prolonged use. As such, in a further embodiment, the present invention involves a method for reducing staining of mold surfaces and/or a method of reducing flow marks in a molded article during continuous use in transfer molding operations, by incorporating into an epoxy-based molding compound a PPO compound having a Tg between about 165° C. to about 190° C.

The invention will now be described by the following examples. The examples are intended to be illustrative only and are not intended to limit the scope of the invention.

EXAMPLES

Example 1

A molding composition represented as Sample 1 was prepared according to the formulation as indicated in Table 1 below. All of the components were dry blended. The molding composition contained an epoxy cresol novolac resin with a phenol novolac hardener. Sample 1 was prepared without any PPO as a stress reliever, thus representing a comparative example for the present invention. The weight % (wt. %) indicated below were calculated based on the total weight of the compositions.

TABLE 1

| COMPONENTS | SAMPLE NO. 1 (comparative) |
|---|---|
| Silica Filler (wt. %) | 79.75 |
| Epoxy Cresol Novolac Resin (wt. %) | 7.37 |
| Phenol Novolac Hardener (wt. %) | 1.31 |
| Xylock Flexible Hardener (wt. %) | 5.33 |
| Polyphenyleneoxide Stress Reliever (wt. %) | — |
| Carbon Black Colorant (wt. %) | 0.30 |
| Ion Scavenger (wt. %) | 0.30 |
| Amine Catalyst (wt. %) | 0.20 |
| Melamine Cyanurate (wt. %) | 3.00 |
| Zinc Oxide (wt. %) | 0.40 |
| Zinc Borate (wt. %) | 0.50 |
| Fumed Silica (wt. %) | 0.40 |
| Waxes (wt. %) | 0.44 |
| Silane Couple Agents (wt. %) | 0.70 |

Example 2

Five molding compositions represented as Samples 2-6 were prepared according to the formulations as indicated in Table 2A below by dry blending all of the components. Each molding composition contained an epoxy cresol novolac resin with a phenol novolac hardener, with varying amounts of a PPO having a low glass transition temperature (Tg) as a stress reliever. The weight % (wt. %) indicated below were calculated based on the total weight of the compositions.

TABLE 2A

| | SAMPLE NO. | | | | |
|---|---|---|---|---|---|
| COMPONENTS | 2 (comparative) | 3 (comparative) | 4 (comparative) | 5 (comparative) | 6 (comparative) |
| Silica Filler (wt. %) | 78.95 | 78.30 | 78.15 | 78.15 | 77.75 |
| Epoxy Cresol Novolac Resin (wt. %) | 7.28 | 7.28 | 7.28 | 7.28 | 7.28 |

TABLE 2A-continued

| COMPONENTS | SAMPLE NO. | | | | |
|---|---|---|---|---|---|
| | 2 (comparative) | 3 (comparative) | 4 (comparative) | 5 (comparative) | 6 (comparative) |
| Phenol Novolac Hardener (wt. %) | 1.27 | 1.27 | 1.27 | 1.27 | 1.27 |
| Xylock Flexible Hardener (wt %) | 5.34 | 5.33 | 5.34 | 5.34 | 5.34 |
| Polyphenyleneoxide Stress Reliever (wt. %) (Tg @ 159° C.)[1] | 0.80 | 1.45 | 1.60 | 1.60 | 2.00 |
| Carbon Black Colorant (wt. %) | 0.30 | 0.30 | 0.30 | 0.30 | 0.30 |
| Ion Scavenger (wt. %) | 0.30 | 0.30 | 0.30 | 0.30 | 0.30 |
| Amine Catalyst (wt. %) | 0.19 | 0.20 | 0.19 | 0.19 | 0.19 |
| Melamine Cyanurate (wt. %) | 3.00 | 3.00 | 3.00 | 3.00 | 3.00 |
| Zinc Oxide (wt. %) | 0.40 | 0.40 | 0.40 | 0.40 | 0.40 |
| Zinc Borate (wt. %) | 0.50 | 0.50 | 0.50 | 0.50 | 0.50 |
| Fumed Silica (wt. %) | 0.40 | 0.40 | 0.40 | 0.40 | 0.40 |
| Waxes (wt. %) | 0.57 | 0.57 | 0.57 | 0.57 | 0.57 |
| Silane Couple Agents (wt. %) | 0.70 | 0.70 | 0.70 | 0.70 | 0.70 |

[1]GE SA 120, available from GE

Each of the molding compositions of Samples 1-6 were prepared based on the formulations set forth in Tables 1 and 2A. The components of each sample were separately combined and dry blending to form a homogeneous mixture. Each of the mixtures were then treated on a hot differential roll mill, with one roll heated to about 90° C. and the other roll cooled with tap water, to produce uniform sheets. After cooling, the sheets were individually ground to a powder and pelletized using a hydraulic hand press.

Each of the molding compositions were then used in a transfer molding process to encapsulate an electronic device. In particular, each of the molding compositions were individually charged to a Brilliant 100 transfer molding press equipped with a multi-cavity mold for coating electronics. Twenty lead SOIC were loaded into the molding cavities. The molding compositions were then subjected to molding conditions at 175° C. and 600 psi for 1 minute.

After molding, the encapsulated electronic assemblies were subjected to JEDEC Level 1 performance testing parameters according to industry standards. In particular, each of the assemblies were initially visibly examined using surface acoustic microscopy, observing the interface of the molding compound at each of the top of the lead, the top of the die, and the back of the lead. The assemblies were then subjected to conditions of 85° C. and 85% relative humidity for a time period of 168 hours. Thereafter assemblies were allowed to cool for about 30 minutes, after which time they were subjected to re-flow conditions in a Heller 1700 re-flow oven at a temperature of 260° C. for a time period of 0.3 minutes. These re-flow conditions were repeated three times for each sample. After cooling, the assemblies were again visually examined using an ultrasound device to observe the interface of the molding compound at the contact points as noted above. This interface observation after exposure and re-flow was then compared with the initial interface observation, with any deviation in the amount of interface adhesion demonstrating delamination between the molding compound and the electronic device. The results are shown in Table 2B.

TABLE 2B

| INTERFACE LOCATION | SAMPLE NO. | | | | | |
|---|---|---|---|---|---|---|
| | 1 (comparative) | 2 (comparative) | 3 (comparative) | 4 (comparative) | 5 (comparative) | 6 (comparative) |
| Lead Top (% delamination) | 24.2 | 12.50 | 9.17 | 6.67 | 8.5 | 5.8 |
| Die Top (% delamination) | 0.0 | 0.00 | 0.00 | 0.00 | 0.00 | 0.00 |
| Lead Back (% delamination) | 14.6 | 5.63 | 5.00 | 5.00 | 5.00 | 5.00 |
| % Average Delamination | 12.9 | 6.0 | 4.7 | 3.9 | 4.5 | 3.6 |

Additionally, moldability defect studies were conducted for each of the samples. In particular, samples of each of the molding compounds were continuously charged to the transfer molding press in individual shots under molding conditions as set forth above. After each shot, the molding press was examined for any staining of the press, and the encapsulated electronic devices as prepared were examined for any streaking or flow marks across or within the encapsulated surface. The results are shown in Table 2C.

TABLE 2C

| | SAMPLE NO. | | | | | |
|---|---|---|---|---|---|---|
| | 1 (comparative) | 2 (comparative) | 3 (comparative) | 4 (comparative) | 5 (comparative) | 6 (comparative) |
| Number of shots to mold staining | >20 | >20 | 10 | <10 | 2 | 1-2 |

The results of Tables 2B and 2C demonstrate that molding compositions prepared without any PPO (Sample 1) exhibit acceptable moldability with no mold staining for more than 20 shots or charges to the molding press, but fail to meet JEDEC Level 1 performance standards, exhibiting unacceptable delamination results with an average of 12.9% delamination within the package. A comparison of Samples 2-6 demonstrate that the use of a low Tg PPO within molding compositions decreases the delamination after JEDEC Level 1 testing conditions, and that increasing the level of a low Tg PPO reduces delamination. However, such increase in PPO having a low Tg also greatly reduces the moldability as demonstrated through the increase in mold staining between Samples 2-6.

Example 3

Three molding compositions represented as Samples 7-9 were prepared according to the formulations as indicated in Table 3A below by dry blending all of the components. Each molding composition contained an epoxy cresol novolac resin with a phenol novolac hardener, with varying amounts of a PPO having a high glass transition temperature (Tg) as a stress reliever. The weight % (wt. %) indicated below were calculated based on the total weight of the compositions.

TABLE 3A

| | SAMPLE NO. | | |
|---|---|---|---|
| COMPONENTS | 7 (comparative) | 8 (comparative) | 9 (comparative) |
| Silica Filler (wt. %) | 78.95 | 78.30 | 77.75 |
| Epoxy Cresol Novolac Resin (wt. %) | 7.28 | 7.28 | 7.28 |
| Phenol Novolac Hardener (wt. %) | 1.27 | 1.27 | 1.27 |
| Xylock Flexible Hardener (wt. %) | 5.34 | 5.33 | 5.34 |
| Polyphenyleneoxide Stress Reliever (wt. %) (Tg @ 228° C.)[1] | 0.80 | 1.6 | 2.00 |
| Carbon Black Colorant (wt. %) | 0.30 | 0.30 | 0.30 |
| Ion Scavenger (wt. %) | 0.30 | 0.30 | 0.30 |
| Amine Catalyst (wt. %) | 0.19 | 0.20 | 0.19 |
| Melamine Cyanurate (wt. %) | 3.00 | 3.00 | 3.00 |
| Zinc Oxide (wt. %) | 0.40 | 0.40 | 0.40 |
| Zinc Borate (wt. %) | 0.50 | 0.50 | 0.50 |
| Fumed Silica (wt. %) | 0.40 | 0.40 | 0.40 |
| Waxes (wt. %) | 0.57 | 0.57 | 0.57 |
| Silane Couple Agents (wt. %) | 0.70 | 0.70 | 0.70 |

[1]GE SA 630-111, available from GE

Each of the molding compositions of Samples 7-9 were prepared based on the formulations set forth in Table 3A. The components of each sample were separately combined and dry blending to form a homogeneous mixture. Each of the mixtures were then treated on a hot differential roll mill, with one roll heated to about 90° C. and the other roll cooled with tap water, to produce uniform sheets. After cooling, the sheets were individually ground to a powder and pelletized using a hydraulic hand press.

Each of the molding compositions were then used in a transfer molding process to encapsulate an electronic device. In particular, each of the molding compositions were individually charged to a Brilliant 100 transfer molding press equipped with a multi-cavity mold for coating electronics. Twenty lead SOIC were loaded into the molding cavities. The molding compositions were then subjected to molding conditions at 175° C. and 600 psi for 1 minute.

After molding, the encapsulated electronic assemblies were subjected to JEDEC Level 1 performance testing parameters according to industry standards. In particular, each of the assemblies were initially visibly examined using surface acoustic microscopy, observing the interface of the molding compound at each of the top of the lead, the top of the die, and the back of the lead. The assemblies were then subjected to conditions of 85° C. and 85% relative humidity for a time period of 168 hours. Thereafter assemblies were allowed to cool for about 30 minutes, after which time they were subjected to re-flow conditions in a Heller 1700 re-flow oven at a temperature of 260° C. for a time period of 0.3 minutes. These re-flow conditions were repeated three times for each sample.

After cooling, the assemblies were again visually examined using an ultrasound device to observe the interface of the molding compound at the contact points as noted above. This interface observation after exposure and re-flow was then compared with the initial interface observation, with any deviation in the amount of interface adhesion demonstrating delamination between the molding compound and the electronic device. The results are shown in Table 3B.

TABLE 3B

| INTERFACE LOCATION | SAMPLE NO. | | |
|---|---|---|---|
| | 7 (comparative) | 8 (comparative) | 9 (comparative) |
| Lead Top (% delamination) | 13.5 | 12.5 | 11.9 |
| Die Top (% delamination) | 0.00 | 0.00 | 0.00 |
| Lead Back (% delamination) | 5.00 | 5.00 | 5.00 |
| % Average Delamination | 6.2 | 5.8 | 5.6 |

Additionally, moldability defect studies were conducted for each of the samples. In particular, samples of each of the molding compounds were continuously charged to the transfer molding press in individual shots under molding conditions as set forth above. After each shot, the molding press was examined for any staining of the press, and the encapsulated electronic devices as prepared were examined for any streaking or flow marks across or within the encapsulated surface. The results are shown in Table 3C.

TABLE 3C

| | SAMPLE NO. | | |
|---|---|---|---|
| | 7 (comparative) | 8 (comparative) | 9 (comparative) |
| Number of shots to mold staining | >20 | >20 | >20 |

The results of Tables 3B and 3C demonstrate that molding compositions prepared with a high Tg PPO have acceptable moldability, with greater than 20 shots prior to mold staining. However, the use of a high Tg increases the delamination within the package, particularly when compared with the values of Samples 2-6 of Example 2, which include a low Tg PPO.

Example 4

Two molding compositions represented as Samples 10-11 were prepared according to the formulations as indicated in Table 4A below by dry blending all of the components. Each molding composition contained an epoxy cresol novolac resin with a phenol novolac hardener. Sample 10 included a PPO having a low Tg (below 160° C.) as a stress reliever, while Sample 11 included a PPO having a high Tg (above 220° C.) as a stress reliever. Both samples included identical proportions of components, with the weight % (wt. %) indicated below calculated based on the total weight of the compositions.

TABLE 4

| | SAMPLE NO. | |
|---|---|---|
| COMPONENTS | 10 | 11 |
| Silica Filler (wt. %) | 78.30 | 78.30 |
| Epoxy Cresol Novolac Resin (wt. %) | 7.37 | 7.37 |
| Phenol Novolac Hardener (wt. %) | 1.31 | 1.31 |
| Xylock Flexible Hardener (wt. %) | 5.33 | 5.33 |
| Low Tg Polyphenyleneoxide Stress Reliever (wt. %) (Tg @ 159° C.)[1] | 1.45 | — |
| High Tg Polyphenyleneoxide Stress Reliever (wt. %) (Tg @ 228° C.)[2] | — | 1.45 |

TABLE 4-continued

| | SAMPLE NO. | |
|---|---|---|
| COMPONENTS | 10 | 11 |
| Carbon Black Colorant (wt. %) | 0.30 | 0.30 |
| Ion Scavenger (wt. %) | 0.30 | 0.30 |
| Amine Catalyst (wt. %) | 0.20 | 0.20 |
| Melamine Cyanurate (wt. %) | 3.00 | 3.00 |
| Zinc Oxide (wt. %) | 0.40 | 0.40 |
| Zinc Borate (wt. %) | 0.50 | 0.50 |
| Fumed Silica (wt. %) | 0.40 | 0.40 |
| Waxes (wt. %) | 0.44 | 0.44 |
| Silane Couple Agents (wt. %) | 0.70 | 0.70 |

[1] GE SA 120, available from GE
[2] GE SA 630-111, available from GE

The molding compositions of Samples 10-11 were prepared based on the formulations set forth above in a similar manner as in Examples 1-3, by combining and dry blending to form a homogeneous mixture, followed by roll milling, grinding and pelletizing. Each of the compositions were then used in a transfer molding process to encapsulate an electronic device, the encapsulated electronic assemblies were subjected to JEDEC Level 1 testing parameters, and delamination and moldability studies were conducted as set forth in Example 2. The results for these studies of Samples 10 and 11 are set forth in Tables 4B and 4C.

TABLE 4B

| | SAMPLE NO. | |
|---|---|---|
| INTERFACE LOCATION | 10 | 11 |
| Lead Top (% delamination) | 5.8 | 27.3 |
| Die Top (% delamination) | 0.0 | 0.0 |
| Lead Back (% delamination) | 5.8 | 14.4 |
| % Average Delamination | 3.9 | 13.9 |

TABLE 4C

| | SAMPLE NO. | |
|---|---|---|
| | 10 | 11 |
| Number of shots to mold staining | 40 | 465 |

As can be seen from the results of Tables 4B and 4C, molding compositions prepared with a low Tg PPO (Sample 10) exhibit excellent delamination results after JEDEC Level 1 testing conditions, showing an average of 3.9% delamination. However, mold staining is observed after 40 shots or charges to the molding press. A molding composition using a high Tg PPO (Sample 11) greatly improves moldability, with 465 shots or charges to the molding press before any mold staining is observed. However, Sample 11 did not have acceptable delamination properties, with an average of 13.9% delamination after JEDEC Level 1 testing conditions.

Example 5

Low Tg PPO compounds (below 160° C.) were mixed and melt blended with high Tg PPO compounds (above 220° C.) at varying ratios according to Table 5. The mixtures were prepared by combining the low and high Tg PPO compounds at the indicated ratios, and melt mixing the compounds at a temperature at or above 230° C. using a BP-MP19 extruder.

After extruding, each of the mixtures as prepared were tested to determine the melting points using differential scanning calorimetry (DSC), and compared with DSC melting points for a 100% low Tg PPO compound and a 100% high Tg PPO compound. The results are shown in Table 5.

TABLE 5

| Mixture | Low Tg PPO[1] % | High Tg PPO[2] % | Melt Onset ° C. | Melt Peak ° C. |
|---|---|---|---|---|
|  | 100 | 0 | 159 | 171 |
| A | 70 | 30 | 168 | 183 |
| B | 60 | 40 | 172 | 186 |
| C | 50 | 50 | 180 | 191 |
|  | 0 | 100 | 228 | 242 |

[1]GE SA 120, available from GE (Tg measured at 159° C. by DSC)
[2]GE SA 630-111, available from GE (Tg measured at 228° C. by DSC)

Example 6

Each of the melt blended PPO Mixtures A, B and C from Example 4 were used to prepare molding compositions represented as Samples 12-15 according to the formulations as indicated in Table 6A below, by dry blending all of the components. In particular, the melt blended PPO Mixtures A, B and C as prepared according to the melt blending procedures of Example 4 were incorporated into molding compositions by dry blending with the components and proportions set forth in Table 5A, producing molding compounds as Samples 12-15 including a melt blended mixture of PPO components at varying ratios of Low Tg and High Tg PPO's. The weight % (wt. %) indicated below were calculated based on the total weight of the compositions.

TABLE 6A

| | SAMPLE NO. | | | |
|---|---|---|---|---|
| COMPONENTS | 12 | 13 | 14 | 15 |
| Silica Filler (wt. %) | 78.30 | 78.30 | 78.30 | 78.30 |
| Epoxy Cresol Novolac Resin (wt. %) | 7.37 | 7.37 | 7.37 | 7.37 |
| Phenol Novolac Hardener (wt. %) | 1.31 | 1.31 | 1.31 | 1.31 |
| Xylock Flexible Hardener (wt. %) | 5.33 | 5.33 | 5.33 | 5.33 |
| Mixture A from Example 4 (70% Low Tg PPO/30% High Tg PPO) | 1.45 | — | — | — |
| Mixture B from Example 4 (60% Low Tg PPO/40% High Tg PPO) | — | 1.45 | 1.45 | — |
| Mixture C from Example 4 (50% Low Tg PPO/50% High Tg PPO) | — | — | — | 1.45 |
| Carbon Black Colorant (wt. %) | 0.30 | 0.30 | 0.30 | 0.30 |
| Ion Scavenger (wt. %) | 0.30 | 0.30 | 0.30 | 0.30 |
| Amine Catalyst (wt. %) | 0.20 | 0.20 | 0.20 | 0.20 |
| Melamine Cyanurate (wt. %) | 3.00 | 3.00 | 3.00 | 3.00 |
| Zinc Oxide (wt. %) | 0.40 | 0.40 | 0.40 | 0.40 |
| Zinc Borate (wt. %) | 0.50 | 0.50 | 0.50 | 0.50 |
| Fumed Silica (wt. %) | 0.40 | 0.40 | 0.40 | 0.40 |
| Waxes (wt. %) | 0.44 | 0.44 | 0.44 | 0.44 |
| Silane Couple Agents (wt. %) | 0.70 | 0.70 | 0.70 | 0.70 |

[1]GE SA 120, available from GE
[2]GE SA 630-111, available from GE

The molding compositions of Samples 12-15 were prepared based on the formulations set forth above in a similar manner as with the procedures above for Samples 1-11, by combining and dry blending the components to form a homogeneous mixture, followed by roll milling, grinding and pelletizing. Each of the Samples 12-15 were then used in a transfer molding process to encapsulate an electronic device, the encapsulated electronic assemblies were subjected to JEDEC Level 1 testing parameters, and delamination and moldability studies were conducted as set forth in Examples 2 and 3. The results for these studies of Samples 12-15 are set forth in Tables 6B and 6C.

TABLE 6B

| | SAMPLE NO. | | | |
|---|---|---|---|---|
| INTERFACE LOCATION | 12 | 13 | 14 | 15 |
| Lead Top (% delamination) | 5.4 | 5.6 | 5.4 | 15.4 |
| Die Top (% delamination) | 0.0 | 0.0 | 0.0 | 0.0 |
| Lead Back (% delamination) | 5.0 | 5.0 | 5.0 | 8.5 |
| % Average Delamination | 3.5 | 3.5 | 3.5 | 8.0 |

TABLE 6C

| | SAMPLE NO. | | | |
|---|---|---|---|---|
| | 12 | 13 | 14 | 15 |
| Number of shots to mold staining | 140 | >40 | 500 | >20 |

As can be seen from the results of Tables 6B and 6C, molding compositions prepared with a PPO having a Tg between 168 and 180° C., and in particular molding compositions including melt blended mixtures of a low Tg PPO and a high Tg PPO, exhibit improved and unexpected results with respect to delamination and moldability, particularly when compared with the same testing results for Samples 1-11. For example, Samples 1-11 (representing molding compositions including either no PPO, a low Tg PPO or a high Tg PPO) demonstrated acceptable levels for either delamination or mold staining. All of inventive Samples 12-15, however, demonstrated acceptable delamination and mold staining after JEDEC Level 1 testing conditions.

Moreover, while all of Samples 12-15 demonstrate acceptable levels of delamination and acceptable levels of mold staining, Samples 13 and 14, representing molding compositions including PPO with a Tg of about 172° C. (based on a 60% low Tg PPO/40% high Tg PPO melt blended mixture), demonstrate excellent results, with 3.5% average delamination and 500 shots or charges to the molding press before any mold staining is observed.

Example 7

Three molding compositions represented as Samples 16-18 were prepared according to the formulations as indicated in Table 7A below by dry blending all of the components. Each molding composition contained an epoxy cresol novolac resin with a phenol novolac hardener, with varying amounts of the melt blended PPO Mixture B from Example 5. The weight % (wt. %) indicated below were calculated based on the total weight of the compositions.

TABLE 7A

| | SAMPLE NO. | | |
|---|---|---|---|
| COMPONENTS | 16 | 17 | 18 |
| Silica Filler (wt. %) | 78.95 | 78.30 | 77.75 |
| Epoxy Cresol Novolac Resin (wt. %) | 7.28 | 7.28 | 7.28 |
| Phenol Novolac Hardener (wt. %) | 1.27 | 1.27 | 1.27 |
| Xylock Flexible Hardener (wt. %) | 5.34 | 5.33 | 5.34 |
| Mixture B from Example 4 (60% Low Tg PPO/40% High Tg PPO) | 0.80 | 1.60 | 2.00 |

TABLE 7A-continued

| COMPONENTS | SAMPLE NO. | | |
|---|---|---|---|
| | 16 | 17 | 18 |
| Carbon Black Colorant (wt. %) | 0.30 | 0.30 | 0.30 |
| Ion Scavenger (wt. %) | 0.30 | 0.30 | 0.30 |
| Amine Catalyst (wt. %) | 0.19 | 0.20 | 0.19 |
| Melamine Cyanurate (wt. %) | 3.00 | 3.00 | 3.00 |
| Zinc Oxide (wt. %) | 0.40 | 0.40 | 0.40 |
| Zinc Borate (wt. %) | 0.50 | 0.50 | 0.50 |
| Fumed Silica (wt. %) | 0.40 | 0.40 | 0.40 |
| Waxes (wt. %) | 0.57 | 0.57 | 0.57 |
| Silane Couple Agents (wt. %) | 0.70 | 0.70 | 0.70 |

The molding compositions of Samples 16-18 were prepared based on the formulations set forth above in a similar manner as with the procedures above for Samples 1-11, by combining and dry blending the components to form a homogeneous mixture, followed by roll milling, grinding and pelletizing. Each of the Samples 16-18 were then used in a transfer molding process to encapsulate an electronic device, the encapsulated electronic assemblies were subjected to JEDEC Level 1 testing parameters, and delamination and moldability studies were conducted as set forth in Examples 2 and 3. The results for these studies of Samples 16-18 are set forth in Tables 7B and 7C.

TABLE 7B

| INTERFACE LOCATION | SAMPLE NO. | | |
|---|---|---|---|
| | 16 | 17 | 18 |
| Lead Top (% delamination) | 12.3 | 9.6 | 8.2 |
| Die Top (% delamination) | 0.00 | 0.00 | 0.00 |
| Lead Back (% delamination) | 5.00 | 5.00 | 5.00 |
| % Average Delamination | 5.8 | 4.9 | 4.4 |

TABLE 7C

| | SAMPLE NO. | | |
|---|---|---|---|
| | 16 | 17 | 18 |
| Number of shots to mold staining | >20 | >20 | >20 |

The results of Tables 7B and 7C demonstrate that molding compositions prepared with a varying amounts of a melt-blended PPO having a Tg of about 172° C. provide particularly useful compositions with acceptable delamination and moldability. A comparison of Samples 3-6; 7-9; and 16-18 (representing varying amounts of a low Tg PPO; high Tg PPO; and a melt-blended mixture of 60% Low Tg PPO/40% High Tg PPO, respectively) shows the improvements seen in moldability and adherence properties through the use of a PPO having a specific Tg at specific ranges, particularly when compared with similar compositions having a low Tg PPO or a high Tg PPO in the same proportions.

What is claimed is:

1. A curable composition comprising:
   an epoxy resin;
   a curing agent for promoting curing of the epoxy resin; and
   a polyphenylene oxide component comprising a melt blended mixture of at least two different polyphenylene oxide compounds having different glass transition temperatures, wherein the at least two different polyphenylene oxide compounds are melt blended in the absence of the epoxy resin,
   wherein the glass transition temperature of a first polyphenylene oxide compound is below about 200° C., and the glass transition temperature of a second polyphenylene oxide compound is above about 220° C., and
   wherein the ratio of the first polyphenylene oxide compound to the second polyphenylene oxide compound is from about 3:1 to 1:1.

2. The composition of claim 1, wherein the polyphenylene oxide component comprises from about 0.8 percent to about 2.0 percent by weight of the total composition.

3. The composition of claim 1, wherein the epoxy resin is selected from the group consisting of novolac type epoxy resins, bisphenol A type epoxy resins, alicyclic epoxy resins, glycidyl type epoxy resins, biphenyl epoxy resins, napthalene-ring containing epoxy resins, cyclopentadiene-containing epoxy resins, polyfunctional epoxy resins, hydroquinone epoxy resins, stilbene epoxy resins, and combinations thereof.

4. The composition of claim 1, wherein the curing agent is selected from the group consisting of phenol novolac type hardeners, cresol novolac type hardeners, dicyclopentadiene phenol type hardeners, limonene type hardeners, anhydrides, flexible hardeners, and combinations thereof.

5. The composition of claim 1, further comprising an inorganic filler material.

6. The composition of claim 5, wherein the polyphenylene oxide component comprises from about 0.8 percent to about 2.0 percent by weight of the total composition.

7. The composition of claim 5, wherein the epoxy resin is selected from the group consisting of novolac type epoxy resins, bisphenol A type epoxy resins, alicyclic epoxy resins, glycidyl type epoxy resins, biphenyl epoxy resins, napthalene-ring containing epoxy resins, cyclopentadiene-containing epoxy resins, polyfunctional epoxy resins, hydroquinone epoxy resins, stilbene epoxy resins, and combinations thereof.

8. The composition of claim 5, wherein the curing agent is selected from the group consisting of phenol novolac type hardeners, cresol novolac type hardeners, dicyclopentadiene phenol type hardeners, limonene type hardeners, anhydrides, flexible hardeners, and combinations thereof.

9. The composition of claim 5, wherein the curing agent comprises a flexible hardener having a hydroxyl equivalent weight greater than about 150.

10. The composition of claim 5, wherein said filler comprises materials selected from the group consisting of silica, alumina, aluminum oxide, aluminosilicate, silicon nitride, aluminum nitride, silica-coated aluminum nitride, born nitride, clay, talc, mica, kaolin, calcium carbonate, wollastonite, montmorillonite, smectite, rubber particles, nanoparticles, nanoclays, and combinations thereof.

11. The composition of claim 5, further comprising one or more components selected from the group consisting of coupling agents, adhesion modifiers, mold release agents, colorants, rheology modifiers, catalysts, antioxidants, ion scavengers, flame retardants, and combinations thereof.

12. An encapsulant material comprising a reaction product of the composition of claim 5.

13. An electronic device comprising an encapsulant material comprising a reaction product of the composition of claim 5 encapsulating an electronic substrate.

14. The curable composition of claim 1, wherein the glass transition temperature of said first polyphenylene oxide compound is from 150 to 180° C., and the glass transition temperature of said second polyphenylene oxide compound is from 220 to 250° C.

15. The curable composition of claim 1, wherein the ratio of the first polyphenylene oxide compound to the second polyphenylene oxide compound is selected from the group consisting of about 2.3:1 and about 1.5:1.

16. The curable composition of claim 1, wherein the ratio of the first polyphenylene oxide compound to the second polyphenylene oxide compound is about 1.5:1.

17. A method of reducing staining of mold surfaces during a transfer molding operation comprising providing an epoxy-based molding composition comprising:
   an epoxy resin;
   a curing agent for promoting curing of the epoxy resin; and
   a polyphenylene oxide component comprising a melt blended mixture of at least two different polyphenylene oxide compounds having different glass transition temperatures, wherein the at least two different polyphenylene oxide compounds are melt blended in the absence of the epoxy resin,
   wherein the glass transition temperature of a first polyphenylene oxide compound is below about 200° C., and the glass transition temperature of a second polyphenylene oxide compound is above about 220° C.,
   wherein the ratio of the first polyphenylene oxide compound to the second polyphenylene oxide compound is from about 3:1 to 1:1.

18. A method of coating an electrical or electronic device, comprising heating a molding composition to a temperature sufficient to cure the molding composition and form a polymer on the surface of the device, wherein the molding composition comprises:
   an epoxy resin;
   a curing agent for promoting curing of the epoxy resin; and
   a polyphenylene oxide component comprising a melt blended mixture of at least two different polyphenylene oxide compounds having different glass transition temperatures, wherein the at least two different polyphenylene oxide compounds are melt blended in the absence of the epoxy resin,
   wherein the glass transition temperature of a first polyphenylene oxide compound is below about 200° C., and the glass transition temperature of a second polyphenylene oxide compound is above about 220° C., and
   wherein the ratio of the first polyphenylene oxide compound to the second polyphenylene oxide compound is from about 3:1 to 1:1.

19. The method of claim 18, wherein the electrical or electronic device is selected from a semiconductor, a transistor, a diode, or an integrated circuit.

20. An electrical or electronic device formed by the method of claim 18.

* * * * *